(12) United States Patent
Phipps

(10) Patent No.: US 9,013,055 B1
(45) Date of Patent: Apr. 21, 2015

(54) KITE SYSTEM FOR GENERATING ELECTRICITY

(71) Applicant: Jeffrey Sterling Phipps, Tallahassee, FL (US)

(72) Inventor: Jeffrey Sterling Phipps, Tallahassee, FL (US)

( * ) Notice: Subject to any disclaimer, the term of this patent is extended or adjusted under 35 U.S.C. 154(b) by 0 days.

(21) Appl. No.: 14/159,124

(22) Filed: Jan. 20, 2014

(51) Int. Cl.
*F03D 5/00* (2006.01)
*F03D 9/00* (2006.01)

(52) U.S. Cl.
CPC . *F03D 9/002* (2013.01); *F03D 5/00* (2013.01)

(58) Field of Classification Search
CPC ........................................................ F03D 5/00
USPC ......................................... 290/55; 244/153 R
See application file for complete search history.

(56) References Cited

U.S. PATENT DOCUMENTS

| | | | | |
|---|---|---|---|---|
| 3,696,251 | A | * | 10/1972 | Last et al. ........................ 290/53 |
| 3,987,987 | A | | 10/1976 | Payne et al. |
| 5,347,186 | A | * | 9/1994 | Konotchick .................... 310/17 |
| 5,818,132 | A | * | 10/1998 | Konotchick .................... 310/17 |
| 6,072,245 | A | | 6/2000 | Ockels |
| 6,254,034 | B1 | | 7/2001 | Carpenter |
| 6,523,781 | B2 | | 2/2003 | Ragner |
| 6,555,931 | B2 | | 4/2003 | Mizzi |
| 7,188,808 | B1 | | 3/2007 | Olson |
| 7,275,719 | B2 | | 10/2007 | Olson |
| 8,066,225 | B1 | | 11/2011 | Tigner |
| 8,405,244 | B2 | * | 3/2013 | Zhang et al. .................... 290/55 |
| 2002/0040948 | A1 | * | 4/2002 | Ragner ..................... 244/153 R |
| 2003/0034697 | A1 | * | 2/2003 | Goldner et al. ................. 310/17 |
| 2005/0046197 | A1 | | 3/2005 | Kingsley |
| 2007/0261624 | A1 | * | 11/2007 | Wrage ........................ 114/102.1 |

FOREIGN PATENT DOCUMENTS

EP           391601 A2  * 10/1990
GB           2469740 A  * 10/2010

* cited by examiner

*Primary Examiner* — Joseph Waks
(74) *Attorney, Agent, or Firm* — Peter Loffler

(57) ABSTRACT

A kite based electricity generation system uses a kite that is tethered to a permanent magnet. The permanent magnet is slidably disposed within a housing with an electric coil disposed therein, such that sliding of the magnet within the housing slides the magnet within the coil and generates electricity. As the kite is subject to a wind load, the kite pulls the magnet through the coil toward a top of the housing. When the wind load decreases, a spring biases the magnet in a reverse direction, each time the magnet sliding within the coil and generating electricity. The housing pivots with respect to a base to which the housing is attached and may also rotate with respect to the base, such pivoting and rotation may generate additional electricity.

10 Claims, 4 Drawing Sheets

KITE SYSTEM FOR GENERATING ELECTRICITY

BACKGROUND OF THE INVENTION

1. Field of the Invention

The present invention relates to an electrical generator that relies on changes of altitude and direction of an aloft kite for passing a permanent magnet through a coil to generate electricity.

2. Background of the Prior Art

As the world tries to lessen its dependence on fossil fuels for its energy needs, various renewable energy sources are being investigated. Such renewable sources include solar power, wind power, hydrodynamic power, and geothermal capture, each with its own benefits of implementation and hurdles to overcome. These renewable sources, and others yet to be explored, have an aim of converting the power source to electricity and using the electricity to power the various implements used by humans, either directly, such as the running of a factory or the lighting, heating and cooling of a modern house, or indirectly wherein the electricity is transferred to an energy store, such as a battery, and thereafter having an implement, such as an electric vehicle, draw its energy requirements from the energy store. Substantial research and development resources are being invested in such renewable energy sources.

One of the renewable energy sources, wind power, has been used for hundreds of years for energy production. From blowing sailing ships across the oceans to turning wind mills that are used to mill grains and pump water, the immense power of the wind has long been appreciated. Recently, the wind has been harvested for the production of electricity. Typically, large wind turbines are installed in an area that is prone to prolonged periods of strong winds in order to extract energy from the wind. As the wind blows onto the vanes of the wind turbine, the turbine rotates causing a permanent magnet to rotate within a coil, thereby creating electricity. Although large amounts of electricity can be generated by wind mills, certain shortcomings are noted.

Wind turbines are large structures, typically on the order of between about 130 feet to about 300 feet, with the larger turbines producing more energy. Such large structures tend to be unsightly, even from a distance, especially, when clustered in a turbine farm, so that most wind turbine farms are located in remote areas away from population centers. Wind turbines are statically placed, so that once installed, the wind turbine is a permanent fixture at its point of installation. If the turbine is installed in a population center, as some are, the device cannot be removed during periods of non-economic wind loading on the wind turbine. Such permanency of installation is also an issue in cold climates as wind turbines have low temperature operating limits, such limits often being about −20 degrees Celsius, below which the wind turbines need to be protected from ice accumulation, which ice accumulations can cause inaccurate anemometer readings which can result in high structural loads on the wind turbine and damage thereto. As the wind turbine is permanently installed, the turbine has internal heating to prevent such ice accumulations. If the wind turbine is operating below its low temperature limits and is under low wind loading, external power must be supplied to the turbine in order to operate the internal heating systems to protect the turbine, which external energy reduces the overall efficiency of the turbine.

In addressing some of the shortcomings of the use of wind turbines to harvest wind energy, many researchers are turning to the use of kites for the capture of the wind energy. Unlike a wind turbine, which depends on the wind to rotate the turbine, most kite electrical generator systems depend on the flight path of the kite to harvest the wind energy. Typically, as the kite oscillates either altitudinally or laterally, or some combination thereof, a tether attached to the kite spools and unspools which spooling and unspooling causes a permanent magnet to rotate within a coil to produce energy. Some systems use a pair of kites connected by a tether pulled across a pulley to which the permanent magnet is connected, wherein each kite takes turns pulling on the other kite so as to turn the pulley and thus generate electricity.

These and other kite systems benefit from the fact that the aloft portion of the system is not permanently affixed in that the kite can be refracted as needed, either due to wind, weather, or other conditions. Additionally, kite systems tend to be more pleasing on the eyes relative to wind turbine systems so that there tends to be less resistance to deploying such systems in and near population centers. Small kite systems can be based on a mobile platform and delivered to an area that has short term electrical needs, such as a natural disaster area wherein the power grid has been compromised. However, the current systems still have shortcomings that need to be addressed. Spooling kite systems tend to be complex in design so that such systems are relatively expensive to produce and tend to have high maintenance costs both in man-hours needed to maintain such systems and the non-energy producing down time experienced as a result of the need for maintenance. Dual kite wind-unwind systems also tend to be complex in design and have the added shortcoming of requiring the two kites to work in tandem for proper working and efficiency, which also adds to the complexity of the overall control system and which is not always achievable. This tends to reduce the energy harvesting efficiency of the system.

What is needed is a kite-based electricity generating system that addresses the above stated shortcomings found in the art. Specifically, such a kite system must be of relatively simple design and construction so as to be relatively inexpensive to build and maintain, thereby decreasing the service costs of the system and maximizing the in service time of the system. Such a kite system must not be dependent on two or more kites working in tandem for electrical generation so as to decrease the complexity of the control systems needed by the kite system.

SUMMARY OF THE INVENTION

The kite system for generating electricity of the present invention addresses the aforementioned needs in the art by providing a kite system that produces electricity which kite system is of relatively simple design and construction, being produced using standard manufacturing techniques, so as to make the kite system relatively inexpensive and economically attractive to users of such systems. By being of relatively simple design, the kite system for generating electricity is relatively simple and straightforward to maintain so as to minimize the service costs of the system and increase the overall in-service time of the system. The kite system for generating electricity utilizes a single kite to generate electricity thereby eliminating the need for expensive and complex flight controls.

The kite system for generating electricity of the present invention is comprised of a housing that has a top, a bottom and a hollow interior. An electric coil is located on an interior surface of the housing along a portion of the hollow interior. A magnet is slidably disposed within the housing and within the coil. A spring has a first spring end abutting either the top or the bottom of the housing and an opposing second spring end abutting the magnet. A kite is provided and is tethered to the magnet. As the kite is subject to a wind load, the kite flies and pulls on the tether which slides the magnet through a portion of the coil toward the top of the housing thereby generating electricity. When the wind load on the kite decreases, the spring biases the magnet back toward the bottom of the housing sliding the magnet through the housing further generating electricity. The spring may either be a tension spring such that the first spring end of the spring biases against the bottom of the housing, or the spring may be a compression spring such that the first spring end biases against the top of the housing. The housing is attached to a base via a swivel post which allows the housing to translate along a single axis. The housing may also rotate with respect to the base which rotation may generate further electricity. The housing is attached to the swivel post either directly or via an actuator, the actuator being attached to the swivel post and having an extendable and retractable ram, such that the housing is attached to the ram allowing for changing of the position of the housing with respect to the base allowing for dynamic spring constant change depending on the flight path of the kite and the prevailing wind conditions being experienced by the kite.

BRIEF DESCRIPTION OF THE DRAWINGS

Similar reference numerals refer to similar parts throughout the several views of the drawings.

DESCRIPTION OF THE PREFERRED EMBODIMENT

Figure 1:
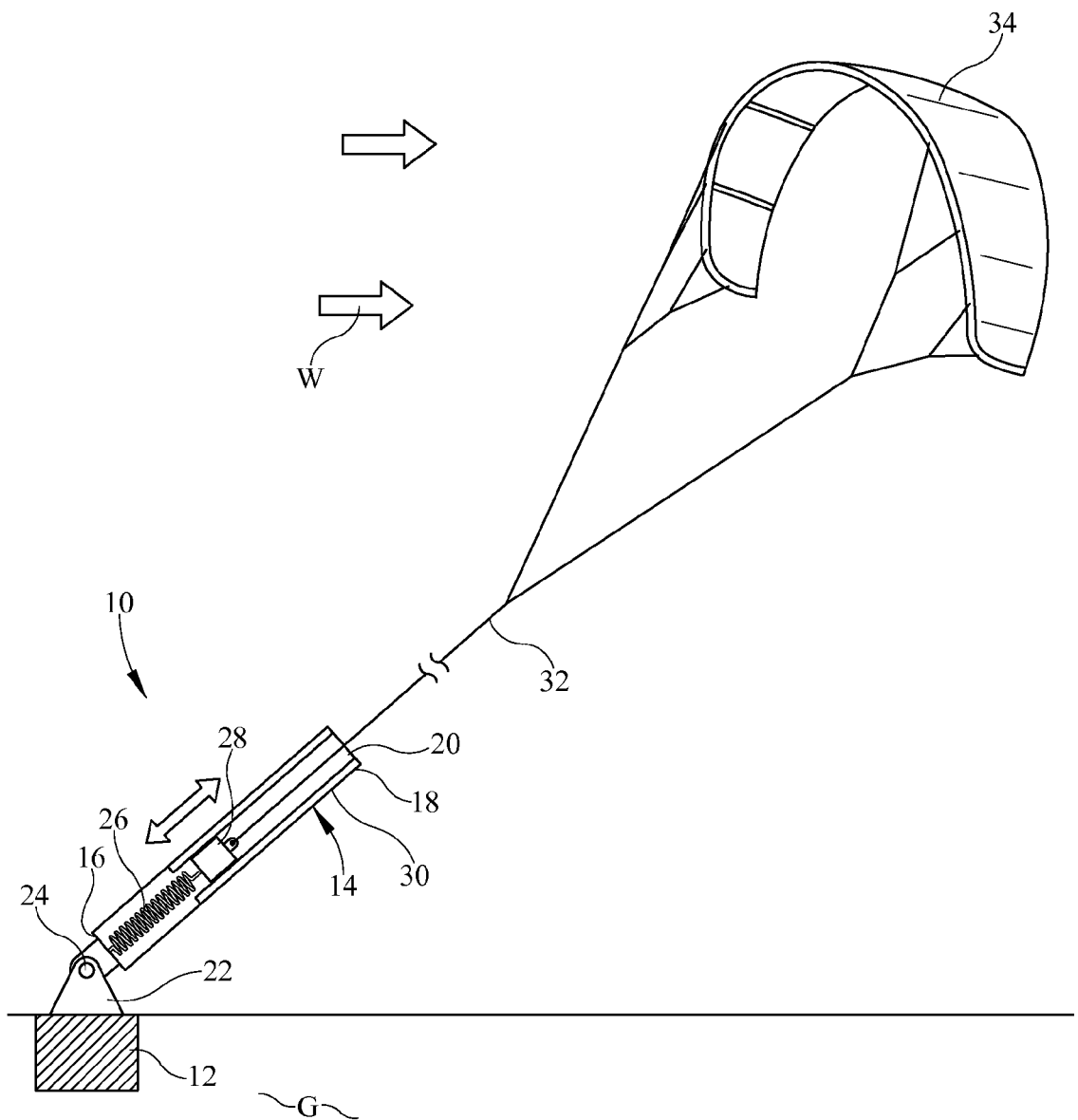
FIG. 1 is a sectioned environmental view of the kite system for generating electricity of the present invention with the spring in a substantially relaxed state.
Figure 2:
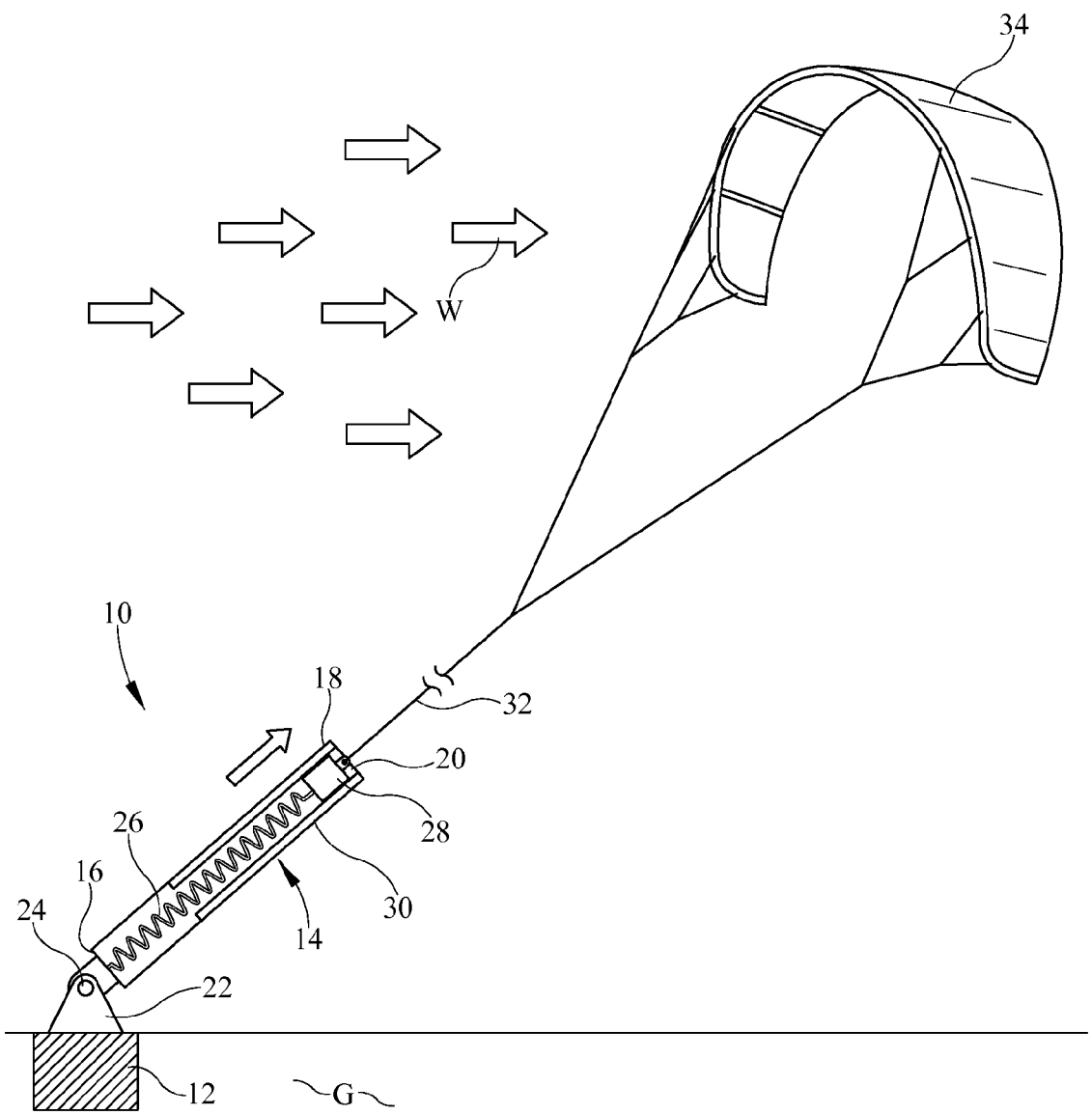
FIG. 2 is a sectioned environmental view of the kite system for generating electricity with the spring in a substantially tense state.
Figure 3:
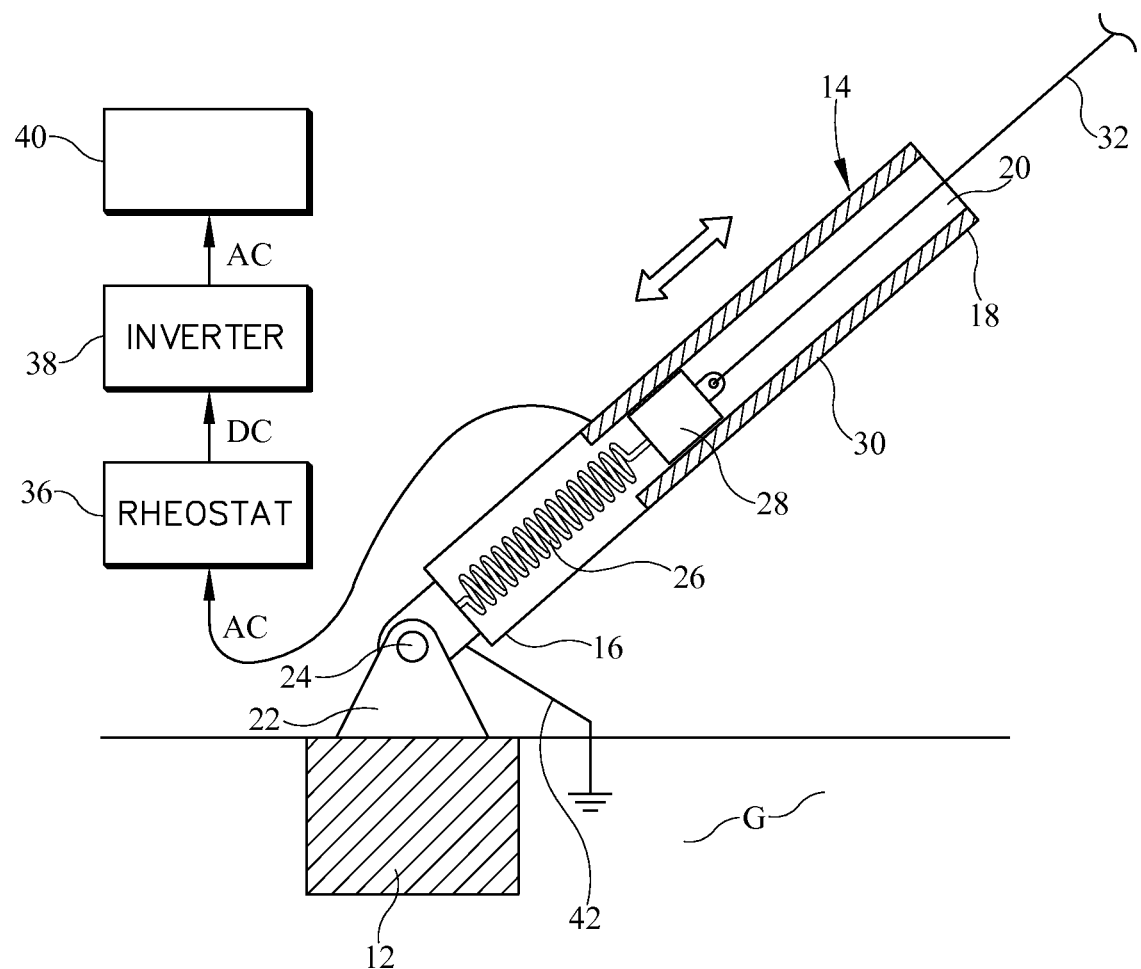
FIG. 3 is a sectioned close up view of the generation subsystem of the kite system for generating electricity.

Referring now to the drawings, it is seen that the kite system for generating electricity of the present invention, generally denoted by reference numeral 10, is comprised of a base 12 that can be secured within the ground G in appropriate fashion. Alternately, the base 12 may be placed on the ground surface, either secured thereto by its own mass, or in some other appropriate way, or can be a mobile base, such as a steel plate or even the bed of a truck or similar vehicle, so that the kite system for generating electricity 10 can be mobile and deployed in a variety of locations. A housing 14, having a bottom 16 and a top 18 with an opening 20 thereat, is attached at its bottom 16, to a post 22 extending upwardly from the base 12 at a swivel joint 24. A tension spring 26 has one end abutting the bottom of 16 the housing 14 with the opposing end of the spring 26 connected to a magnet 28, such as a rare earth permanent magnet or other type of magnet. A coil 30 is disposed within a portion of the interior of the housing 14 such that the magnet 28 is able to slidably linearly reciprocate within the interior of the coil 30. A tether 32 is attached to the top of the magnet 28 and extends upwardly from the top 18 of the housing 14 through the opening 20, the distal end of the tether 32 attached to a kite 34 of desired design, in appropriate fashion.

In operation, as the kite 34 travels through the air under the loading of the wind W, either up and down, or side to side or some combination thereof, the kite 34, when under a wind load, pulls on the tether 32, which pulls on the magnet 28, which slides within the housing 14 through the coil 30 which generates electricity. The pulling on the magnet 28 places the spring 26 into tension so that when the wind loading on the kite 34 decreases, the spring 26 recoils and draws the magnet 28 back toward the bottom 16 of the housing 14, the magnet 28 again sliding through the coil 30, further generating electricity.

The electricity generated is alternating current. The coil 30 is electrically connected to a rheostat 36 which converts the alternating current to direct current. The rheostat 36 is itself electrically connected to an inverter 38 which converts the direct current back to alternating current, with the inverter 38 electrically connected to the electric gird 40 for distribution. Of course, if the kite system for generating electricity 10 is of a mobile configuration, the inverter 38 is connected to an appropriate distribution subsystem (not illustrated) for use of the electricity at the mobile site as desired. A grounding wire 42 grounds the electric subsystem in appropriate fashion.

Advantageously, the oscillation cycle of the magnet 28 through the coil 30 is fairly rapid in order to generate the largest amount of electricity possible under the given wind loads. As such, it is desirable that the kite 35 oscillate up and down or back and forth such as in a circle, a figure-8, etc.), or some combination thereof so that the changing of the altitude and/or direction of the kite 34 results in the oscillation of the magnet 28 within the coil 30. Appropriate flight control surfaces (not illustrated), which may be electrically controlled, may be provided on the kite 34 in order to achieve the largest possible kite flight oscillation. Appropriate sensors (none illustrated) can be provided and controlled via a computer in order to determine the speed, altitude, pitch, speed, etc., of the kite 34, the position of the swivel joint 24, and the prevailing wind conditions in order to appropriately control the flight control surfaces. The computer may also control the various parameters of the electrical generation function.

The swivel joint 24 allows the kite 34 to translate back and forth across a single axis in order for the kite 34 to be properly oriented to the prevailing wind. The swivel joint 24 may be rotatable by appropriate means (not illustrated) in order to manually rotate the swivel joint 24 in order to more particularly orient the kite 34 for a given wind W direction which rotation can be automated based on various sensors (not illustrated) or can be manually controlled by an operator. The swivel joint 24 does not freely rotate as such rotation would consume some of the energy harvested by the kite 34, however, the swivel joint 24 can be designed for free rotation with the additional of a second magnet and a second coil (neither illustrated) associated with the swivel joint 24, so that as the swivel joint 24 rotates due to wind loading on the kite 34 causing the rotation of the swivel joint 24, the second magnet-second coil subsystem also generates electricity.

Figure 4:
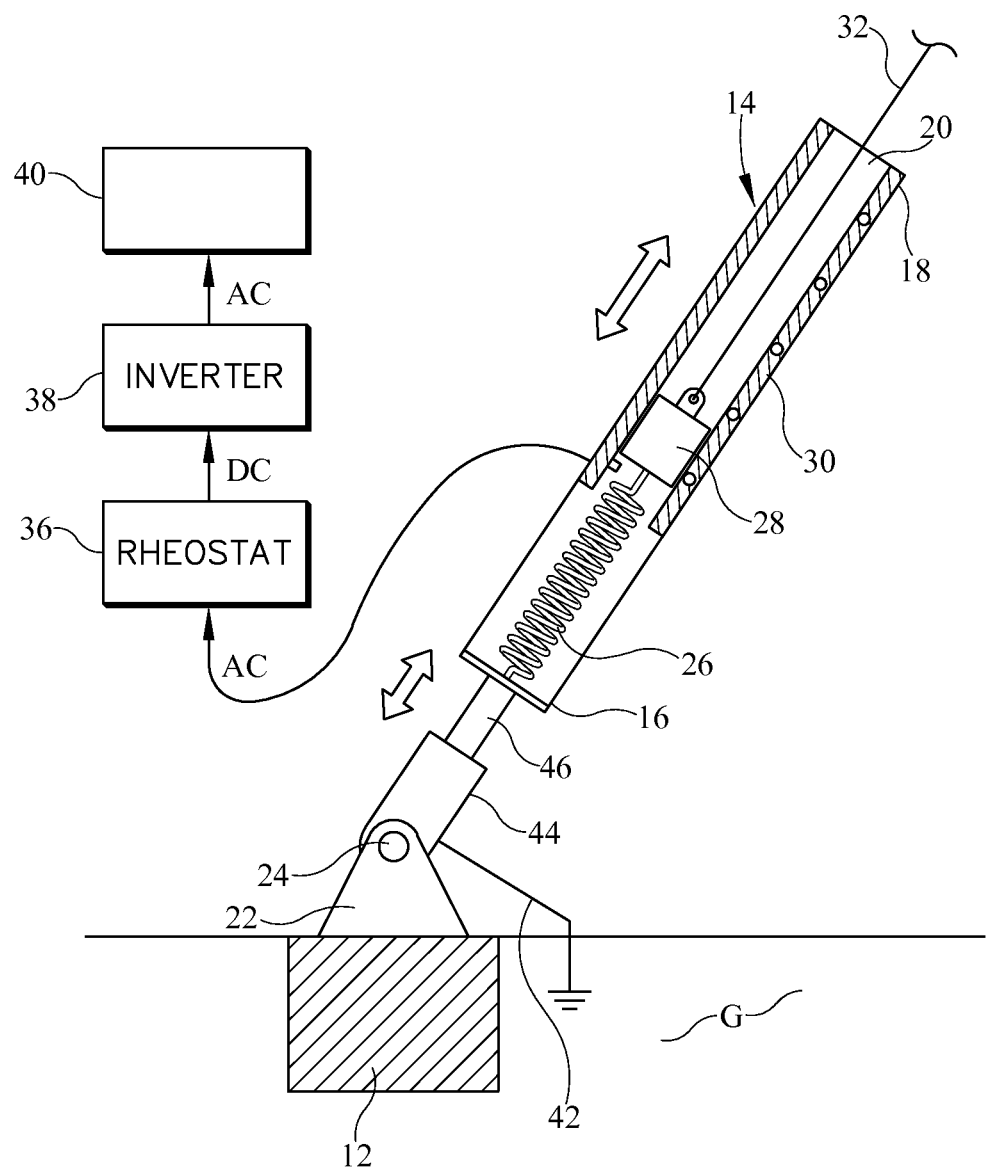
FIG. 4 is a sectioned close up view of the generation subsystem of the kite system for generating electricity utilizing an actuator with a ram.

As seen in FIG. 4, the housing 14 can be connected to the post 22 via an actuator 44 that is connected to the swivel join 24 with the housing 14 connected to the actuator 44 via a ram 46, which ram 46 extends and retracts based on the actions of the actuator 44. The actuator 44, which can be mechanical, hydraulic, etc., and which is connected to a source of power in appropriate fashion (not illustrated), allows the housing 14 to extend out from and retract back toward the post 22 as desired depending on the wind conditions and the position of the kite 34 and swivel joint 24. As the tether 32 connecting the spring 26 with the kite 34 remains of constant length, the relative change of position of the housing 14 with respect to the post 22 causes a change of the spring constant of the spring 26 allowing for maximum efficiency of the electrical gathering ability of the kite system for generating electricity 10. Appropriate sensors (none illustrated) are provided in order to provide the operational conditions of the kite system for generating electricity 10 to an appropriate processor (also not illustrated but possibly but not necessarily the previously mentioned computer) allowing for dynamic control of the actuator 44 via appropriate control signals sent by the processor to the actuator 44, the actuator 44 being of relatively high speed articulation so that such spring constant changes can be rapidly made.

If use of the kite system for generating electricity 10 is not needed, either due to low wind conditions, servicing needs of the unit, or to move the kite system for generating electricity 10 to a different location if the kite system for generating electricity 10 is of a mobile configuration, the kite 34 is simply retracted by spooling the kite 34 in some appropriate fashion.

If is expressly recognized that instead of the use of a tension spring 26 as illustrated and described, a compression spring can be used such that one end of such a compression spring abuts the magnet 28 while an opposing end of such a spring abuts the top 18 of the housing 14 with the kite system for generating electricity otherwise working as described.

While the invention has been particularly shown and described with reference to an embodiment thereof, it will be appreciated by those skilled in the art that various changes in form and detail may be made without departing from the spirit and scope of the invention.

I claim:

1. An electricity generator comprising:
    a housing having a top, a bottom and a hollow interior, and having an electric coil located on an interior surface of the housing along a portion of the hollow interior;
    a magnet slidably disposed within the housing and within the coil;
    a spring having a first spring end abutting either the top or the bottom of the housing and an opposing second spring end abutting the magnet;
    a kite;
    a tether attached to the magnet and to the kite; and
    wherein as the kite is subject to a wind load, the kite flies and pulls on the tether which slides the magnet through a portion of the coil toward the top of the housing thereby generating electricity and when the wind load on the kite lessens, the spring biases the magnet back toward the bottom of the housing sliding the magnet through the housing and the coil further generating electricity.

2. The electricity generator as in claim 1 wherein the spring is a tension spring.

3. The electricity generator as in claim 1 wherein the spring is a compression spring.

4. The electricity generator as in claim 1 wherein the spring is either a tension spring or compression spring.

5. The electricity generator as in claim 1 wherein the housing is attached to a base via a swivel post which allows the housing to translate along a single axis.

6. The electricity generator as in claim 4 wherein the housing rotates with respect to the base.

7. The electricity generator as in claim 6 wherein housing rotation with respect to the base generates further electricity.

8. The electricity generator as in claim 1 further comprising:
    a base;
    an actuator having a ram that extends and retracts with respect to the actuator, such that the housing is attached to the ram and such that the actuator is attached to the base via a swivel post which allows the actuator to translate along a single axis.

9. The electricity generator as in claim 8 wherein the actuator rotates with respect to the base.

10. The electricity generator as in claim 9 wherein actuator rotation with respect to the base generates further electricity.

* * * * *